United States Patent
Hopkinson et al.

[15] 3,691,378
[45] Sept. 12, 1972

[54] SIMULTANEOUS PULSED NEUTRON WELL LOGGING

[72] Inventors: Eric C. Hopkinson; Arthur H. Youmans, both of Houston, Tex.

[73] Assignee: Dresser Industries, Inc., Dallas, Tex.

[22] Filed: June 26, 1970

[21] Appl. No.: 50,268

[52] U.S. Cl. .........250/71.5 R, 250/83.1, 250/83.3 R, 250/83.6 W
[51] Int. Cl. ...............................................G01v 5/00
[58] Field of Search.....250/71.5 R, 83.1, 83.3 R, 83.6 W

[56] References Cited

UNITED STATES PATENTS

| | | | |
|---|---|---|---|
| 3,509,346 | 4/1970 | Mills, Jr. et al. | 250/83.6 W |
| 3,373,280 | 3/1968 | Mills, Jr. | 250/83.6 W X |
| 3,420,998 | 1/1969 | Mills, Jr. | 250/83.6 W X |
| 3,484,609 | 12/1969 | Pritchett et al. | 250/71.5 R |
| 3,379,882 | 4/1968 | Youmans | 250/83.6 W X |

*Primary Examiner*—Archie R. Borchelt
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

Methods and apparatus are disclosed for obtaining simultaneously a well log of the macroscopic thermal neutron cross-section (Neutron Lifetime Log) of formations adjacent a well bore and logs of the capture gamma rays, epithermal neutrons and thermal neutrons returning to a well bore as a result of irradiating the formations adjacent the well bore with pulses of neutrons. The thermal and epithermal neutron logs are obtained by separating the signal from a single detector into two time-dependent groups.

Methods and means are also disclosed for combining the capture gamma ray log with the thermal neutron log to obtain a log indicating the salinity of the fluids contained within said formations. Methods and means are also disclosed for combining the epithermal neutron log with the thermal neutron log to obtain a log related to the macroscopic thermal neutron cross-section of the formations. Either or both of these derived logs may be obtained simultaneously with the first suite of logs.

The preferred embodiment of the apparatus disclosed herein includes a pulsed source of 14-mev neutrons, a gamma ray detector, and a neutron detector sensitive to both thermal and epithermal neutrons in the subsurface instrument. Surface apparatus includes the appropriate gating circuits and ancillary circuits whereby the gamma rays detected while the neutron source is quiescent are used to form three signals corresponding to the gamma rays detected in three time periods. Similarly, the surface apparatus includes gating and ancillary circuits to separate the detected neutrons into two time groups.

27 Claims, 4 Drawing Figures

INVENTORS
ERIC C. HOPKINSON
ARTHUR H. YOUMANS

Thomas P. Hubbard, Jr.

AGENT 3,691,378

SIMULTANEOUS PULSED NEUTRON WELL LOGGING

BACKGROUND OF THE INVENTION

This invention relates to radioactivity well logging and particularly to pulsed neutron logging. More particularly, this invention pertains to new and improved methods and apparatus for deriving a plurality of logs simultaneously wherein each log is a measurement of a particular response of the formations adjacent a well bore to irradiation thereof with pulses of neutrons.

The invention provides novel means for obtaining information whereby improved evaluation of rock formations may be accomplished with a single logging operation. It permits accurate determination of the quantity and nature of fluids contained in formations penetrated by a well bore irrespective of the presence or absence of casing and regardless of the conditions of the borehole as to size and uniformity. It provides a method and apparatus for producing simultaneously, with a single detector, logs based respectively on the detection of thermal neutrons and epithermal neutrons whereas in the prior art two separate detectors were required. This has been accomplished by the discovery that when a pulsed source of neutrons is employed epithermal neutrons and thermal neutrons can each be selectively detected by appropriately controlling the intervals during which the respective measurements are made relative to the neutron source pulses. It has moreover been disclosed how a multiplicity of measurements of thermal neutrons, epithermal neutrons, capture gamma rays and the macroscopic thermal neutron cross-section can be simultaneously produced with a single instrument in a single logging operation.

Among the various methods of using pulsed neutron logging apparatus to obtain information about formations traversed by a well bore are those disclosed in U.S. Pat. No. 3,509,346 issued to Mills, et al, on Apr. 28, 1970. Mills discloses irradiating the formations with repetitive, very short (preferably not greater than about 5 microseconds) bursts of fast neutrons and then measuring epithermal neutrons in a first time interval occurring within about 50 microseconds following each neutron burst as an indication of the porosity of the formations and thermal neutrons in a second time interval which occurs after about 300 microseconds following each neutron burst as an indication of the chemical nature of the formations. As will be seen in more detail below, the Mills method and apparatus is only superficially similar to our invention. It will be also observed that in some respects our invention is directly contrary to the disclosure of Mills. For example, we prefer to detect epithermal neutrons beginning during the neutron bursts rather than waiting until after the end of the bursts.

SUMMARY OF THE INVENTION

In accordance with the method of logging formations traversed by a well bore embodying the present invention, formations are irradiated with neutrons during repetitive, relatively short intervals of time thereby defining successive operating cycles, each including an irradiation interval followed by a quiescent interval of much longer duration than the irradiation interval. A plurality of electrical signals are generated during various portions of each operating cycle using a pair of radiation detectors and the necessary ancillary circuits for separating and analyzing the signals from the detectors. One of the radiation detectors is a high sensitivity, gamma ray detector and the other detector is sensitive to both thermal neutrons and epithermal neutrons. The various electrical signals are recorded simultaneously in correlation with the depth of the detectors in the well bore to obtain a log of the macroscopic thermal neutron cross-section of the formations and epithermal and thermal neutron logs and a capture gamma log as well as logs indicative of the salinity of the formation fluids and of the well bore effects. It will be recognized that this complete suite of logs will not be necessary to solve every exploration problem that is faced.

The apparatus of this invention comprises a subsurface instrument which includes a neutron source and the ancillary equipment necessary to cause it to generate repetitive, relatively short duration pulses of neutrons and a gamma ray detector and a neutron detector including the ancillary circuits necessary for their operation and for transmitting the signals generated by the detectors to analyzing and recording equipment located at the surface of the earth. The surface equipment comprises circuits for separating the signals from the detectors into a plurality of time channels corresponding to selected portions of the operating cycle. The surface equipment also includes circuitry for deriving the logarithm of the ratio of a selected pair of signals as well as circuitry for deriving signals representative of the ratio of different pairs of signals. The surface apparatus further includes means for recording selected groups, or all, of the signals in correlation with the depth of the subsurface instrument in the well bore.

The characteristics and advantages of the invention are further sufficiently identified in connection with the following detailed description of the accompanying drawings, which represent certain embodiments. After considering these examples, persons skilled in this art will understand that variations may be made without departing from the principles disclosed and we contemplate the employment of any structures, arrangements, or methods of operation which are properly within the scope of the appended claims.

DESCRIPTION OF THE PREFERRED EMBODIMENTS

Figure 1:
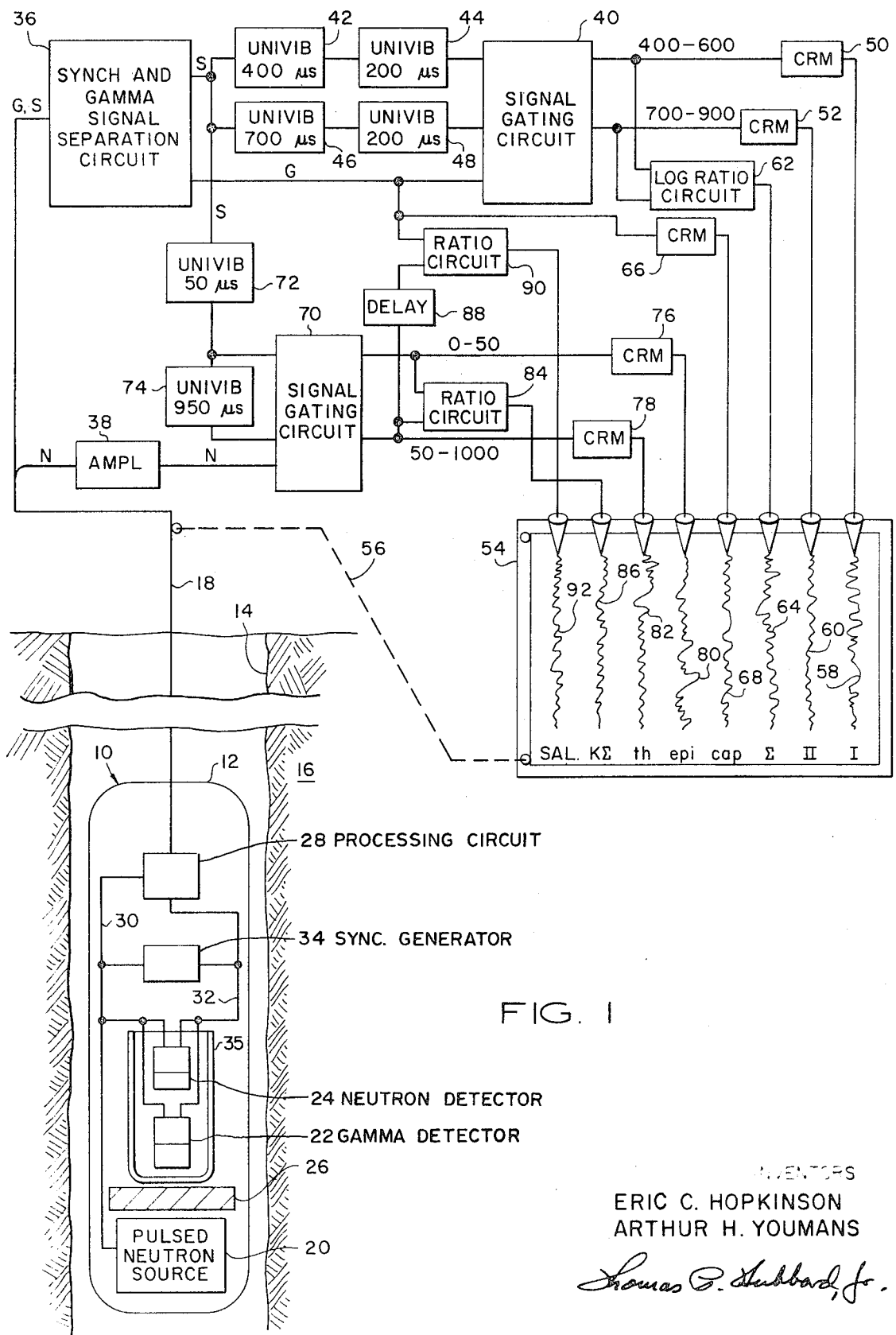
FIG. 1 is a schematic representation of a subsurface instrument suspended within a well bore and electrically connected to surface circuitry shown in block diagram.

One form of the apparatus of this invention which may also be used in carrying out the methods of this invention is shown in FIG. 1. This apparatus includes a subsurface instrument 10 which includes a fluid-tight, pressure resistant housing 12 adapted to traverse a well bore 14 which traverses formations 16. Well bore 14 may be cased or uncased and may or may not contain a liquid such as water or a drilling fluid (neither a casing nor a liquid is shown in FIG. 1).

Subsurface instrument 10 is suspended in the well bore by an armored logging cable 18 which may be used in association with a winch (not shown) at the surface to lower and raise the instrument 10 in the well bore in the customary fashion. Logging cable 18 is a multi-conductor cable with sufficient conductors (not shown) to provide means for transmitting, in the customary fashion, electrical signals from the circuits and apparatus contained within housing 12 to the surface circuitry and apparatus and to transmit electrical power from the surface to the circuits and apparatus contained within housing 12.

Included within housing 10 is a neutron source 20 which may be like the one disclosed in U.S. Pat. No. 3,309,522, issued to Youmans and Hopkinson. Such pulsed neutron sources emit high energy (14 mev) neutrons which then irradiate the formations 16 adjacent the well bore 14 in relatively short, discrete bursts, with the quiescent period between bursts much longer in duration than the bursts. A preferred operating cycle for such a source in this invention is a neutron burst or pulse duration of approximately 15 microseconds and a repetition rate of approximately 1,000 pulses a second (the quiescent period would be approximately 985 microseconds long). While short duration neutron pulses are preferred, the methods of our invention are also applicable with much longer neutron pulse durations, even 100 microseconds with the 1,000 pulses a second repetition rate.

As a result of the neutron irradiaiton of the formations various nuclear phenomena occur which result in various radiations returning to the well bore where they may be detected by detectors contained within housing 12. One of the nuclear phenomena which occurs is the slowing down of the high energy neutrons by elastic and/or inelastic scatterings with the materials making up the formations. Eventually the slowing down processes result in neutrons becoming "epithermal" neutrons. In the context of this invention, epithermal neutrons are considered to be those neutrons with energies above that corresponding to the temperature of the formations, i.e., thermal neutrons, and extending to a few kev. Some of these epithermal neutrons will leave the formations and reach the well bore where they may be detected. Others are subjected to further slowing down until they become thermal neutrons. Some of the thermal neutrons will escape from the formations and reach the well bore where they may be detected, whereas others will remain in the formation and diffuse therein forming a thermal neutron cloud or population which eventually disappears with a "lifetime" characteristic of the formation. This characteristic lifetime is related to the macroscopic thermal neutron capture cross-section, $\Sigma$, of the formation (for a fuller discussion of this process see U. S. Pat. Nos. 3,379,882 and 3,379,884 issued to Youmans). When the thermal neutrons are captured by the materials making up the formation, gamma rays, sometimes called capture gamma rays, are emitted. Some of these gamma rays will escape from the formations and reach the well bore where they may be detected.

This invention contemplates the measurement of each of the radiations and characteristics referred to above and the simultaneous recording of preferred combinations of such measurements.

A gamma ray detector 22 and a neutron detector 24 are mounted in housing 12 in a spaced relationship with respect to each other and to the pulsed neutron source 20. A shield 26 is mounted in housing 12 between source 20 and detectors 22 and 24 to prevent direct transmission of neutrons from the source to the detectors.

Conventional power supply, amplifier, and transmission circuits 28 are mounted in housing 12 and electrically connected to the surface equipment by means of conductors in logging cable 18 and also connected to neutron source 20, gamma ray detector 22, and neutron detector 24 in the customary fashion, whereby the necessary electrical power is transmitted from a power source (not shown) at the surface over conductors in logging cable 18 to the power supply portion of circuits 28 wherein it is appropriately transformed, as needed, into the voltages necessary to operate the neutron source and the detectors and transmitted thereto by means of a multiconductor cable 30.

As shown in FIG. 1, the signals from detectors 22 and 24 are supplied via multiconductor cable 32 to the amplifier and transmission portions of circuits 28. The circuits 28 serve to suitably process the signals from the detectors for transmission to the surface of the earth and to apply the processed signals to the logging cable 18. The specific circuitry included in the circuits 28 depends upon the type of detectors employed and the manner in which the signals are to be transmitted to the surface of the earth. Such circuitry is conventional and forms no part of this invention and will be obvious to those skilled in the art. Typically, circuits 28 will include such circuits as high voltage DC power supplies, emitter-followers, discriminators, amplifiers, scalers and blocking oscillators.

A synchronization signal generator 34 is mounted in housing 18 and electrically connected to the neutron source 20 whereby a signal is generated which identifies the beginning of each neutron pulse from the source 20. This synchronization signal is transmitted over conductors in cable 32 to the amplifier and transmission portion of circuits 28 where it is amplified and prepared for transmission to the surface over conductors in logging cable 18. The details of the synchronization pulse generator circuit 34 are not shown since they form no part of this invention and many suitable circuits are available or may be devised by persons skilled in this art. For example, the synchronization signal may be derived from the negative pulser 100 shown in FIG. 6 or the pulse generator 114 shown in FIG. 7 of U. S. Pat. No. 3,309,522 issued to Youmans.

In the preferred embodiment of this invention, the gamma ray detector 22 is a scintillation counter using a suitable phosphor optically coupled to a photomultiplier tube. Such scintillation counters produce an electrical pulse in response to the detection of each gamma ray. The preferred phosphor is cesium iodide (sodium activated) or, for some small diameter instruments, calcium tungstate. Since such gamma ray detectors are extremely sensitive and are subject to fatigue effects when exposed to high-intensity radiation fields and since this invention does not contemplate measuring gamma rays during the portion of the operating cycle when neutrons are being emitted by source 20, it is desirable, but not necessary, to provide for deactivation of the gamma ray detector 22 while neutrons are being emitted by source 20 and for a short time, e.g., 35-100 microseconds, thereafter. Such deactivation may be accomplished by the system set forth in U.S. Pat. No. 3,254,218 issued to Hopkinson. Gamma ray detector 22 is preferably shielded from neutrons by suitably surrounding the phosphor with a layer of material containing a neutron capturing element, such as boron enriched in the isotope boron-10 or lithium enriched in the isotope lithium-6.

Neutron detector 24 is a detector of both thermal and epithermal neutrons and is preferably a scintillation counter using a lithium iodide phosphor which is enriched with $Li^6$ and activated with europium. It may be made insensitive to gamma rays by employing relatively thin rods or slabs of the lithium iodide in an array which employs a hydrogenous material between the lithium iodide rods or slabs to moderate neutrons and to prevent beta rays from expending their energy wholly within the phosphor (see U.S. Pat. No. 3,032,658 issued to Youmans). A suitable alternative for neutron detector 24 is a high-pressure (for example ten atmospheres) helium-3 proportional counter. Another suitable alternative for neutron detector 24 is the compound scintillation detector shown in U.S. Pat. No. 3,288,996 issued to Monaghan.

To protect detectors 22 and 24 from deleterious effects of high temperatures, it is desirable to insulate them using a Dewar flask 35 when adequate space is available in instrument 10.

As shown in FIG. 1, the gamma ray signal from detector 22 and the synchronization signal from synchronization generator 34 are supplied to a suitable electronic signal separation circuit 36, while the neutron signal from detector 24 is supplied to an amplifier 38. The circuits indicated by blocks 36 and 38 serve to suitably process the signals and to separate the synchronization signal from the gamma ray signal for further processing in the surface equipment. The gamma ray signal is supplied as one input to a suitable signal gating circuit 40 wherein it is separated into two "gates" in accord with a pair of inputs (to circuit 40) derived from the synchronization signal. After separation in separation circuit 36, the synchronization signal is applied successively to a pair of conventional univibrator circuits 42 and 44 in series whereby a first gating signal input for signal gating circuit 40 is obtained. Univibrators 42 and 44 are conventional circuits adjusted to provide respectively 400 microseconds and 200 microseconds delays. As is well known, this will result in an input signal for the signal gating circuit 40 which will open the signal gating circuit only for the "gate" beginning at 400 microseconds and ending 600 microseconds after the beginning of the synchronization signal, i.e., after the beginning of the pulse of neutrons from neutron source 20. In a similar manner, a second gating signal input for gating circuit 40 is derived from the synchronization signal using univibrators 46 and 48 which have respectively 700 microseconds and 200 microseconds delay. As shown in FIG. 1, the signal gating circuit 40 has a pair of outputs called, for convenience, gates I and II, wherein the signal from gate I is that portion of the gamma ray signal from gamma ray detector 22 which occurs between 400 microseconds and 600 microseconds after the beginning of each pulse of neutrons from neutron source 20 and, similarly, the gate II signal is that portion of the gamma ray signal from detector 22 which occurs between 700 microseconds and 900 microseconds after the beginning of each pulse from source 20. The gate I and II signals are applied to conventional counting rate meters 50 and 52, respectively, wherein they are transformed into slowly varying DC signals proportional to the time rate of occurrence of gamma rays in the two time intervals and then applied to the input of recorder 54. Recorder 54 is driven in correlation with the depth of instrument 10, and hence also in correlation with the depth of gamma ray detector 22, by a driving means 56, which includes a sheave wheel driven by the logging cable 18. Thus, gate I and II logs 58 and 60, respectively, are recorded by recorder 54 as logs of the rate of occurrence of gamma rays in the two selected time intervals following each pulse of neutrons from source 20.

Figure 2:
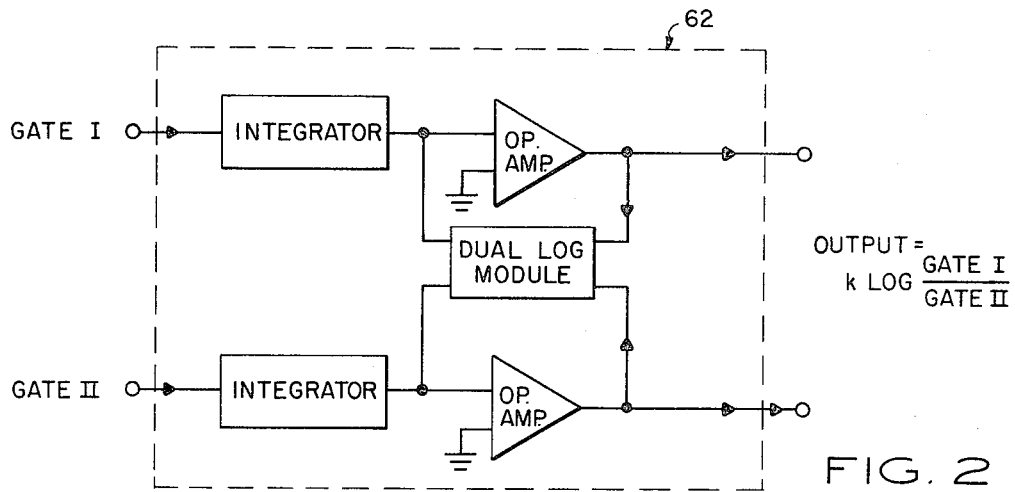
FIG. 2 is a block diagram of a suitable circuit for deriving an electrical signal proportional to the logarithm of the ratio of a pair of input electrical signals.

As is well known in this art, the logarithm of the ratio of the gate I signal to the gate II signal is directly proportional to the macroscopic thermal neutron cross-section, $\Sigma$, of the formations from which the gates I and II signals are derived. As shown in FIG. 1, the gates I and II signals are applied to a circuit 62 wherein this $\Sigma$ signal is derived and then recorded by recorder 54 as the $\Sigma$ log 64. The logarithm of a ratio circuit 62 may be any suitable circuit, many of which are available to those skilled in this art; a schematic representation of one such suitable circuit is shown in FIG. 2 (it is not considered necessary to describe the elements and operation of FIG. 2, since this circuit does not constitute a part of our invention and its form and function is believed to be obvious to those skilled in this art).

The gamma ray signal from the separation circuit 36 is also applied to the input of a conventional counting rate meter 66 wherein it is transformed into a slowly varying DC voltage proportional to the time rate of occurrence of the capture gamma rays detected by detector 22 in the quiescent period between adjacent pulses of neutrons from source 20 and is recorded by recorder 54 as capture gamma ray log 68.

The signal from neutron detector 24 after amplification and processing in amplifier 38 is applied to the input of a signal gating circuit 70, similar to gating circuit 40 in the gamma ray channels. A pair of gating inputs to the gating circuit 70 are derived from univibrators 72 and 74 which have respectively 50 microseconds and 950 microseconds delay. Thus, signal gating circuit 70 has a pair of outputs corresponding first to that portion of the neutron signal from detector 24 occurring between the initiation of each pulse from source 20 and ending 50 microseconds later and a second output corresponding to that portion of the neutron signal from detector 24 beginning 50 microseconds after the beginning of each pulse of neutrons from source 20 and ending 950 microseconds later. These signals are applied respectively to conventional counting rate meters 76 and 78 whose outputs are then applied to the recorder 54 for recording as logs 80 and 82, respectively. Thus, log 80 represents the time rate of detection of neutrons by neutron detector 24 during a time period extending from the beginning of each pulse of neutrons to 50 microseconds thereafter. At the moment of emission all neutrons have an energy of 14 mev. By the end of the 50 microsecond interval, emission of neutrons has ceased and substantially all neutrons have been reduced to thermal energy. Thus, no epithermal neutrons remain in the well bore or formation subsequent to this interval. Within the 50 microsecond interval a small proportion of the thermalized neutrons may be detected along with the detected epithermal neutrons. However, experiments have shown that in representative earth formations the measurement as herein disclosed is preponderately a measurement of epithermal neutrons during the 50 microsecond interval beginning with the start of the pulse of neutrons from the neutron source. The measurement interval of 50 microseconds is a satisfactory interval for the log 80 to be an epithermal neutron log. Log 82 on the other hand is representative of the rate of detection of neutrons by the neutron detector 24 during the time period beginning 50 microseconds and ending 1,000 microseconds after the initiation of each pulse of neutrons and is thus a thermal neutron log.

The above description of the method of obtaining an epithermal neutron log 80 and a thermal neutron log 82 with a single detector is applicable for use with neutron sources whose pulse duration is less than 50 microseconds. For sources which produce longer duration pulses of neutrons, the method of obtaining the epithermal log need not be changed, i.e., log 80 would still represent the time rate of detection of neutrons in the 50 microsecond interval, even though the neutron pulse has not terminated when the detection interval is over. However, the longer neutron pulse would require a modification in the method and apparatus for obtaining the thermal neutron log 82. For such sources the measurement for thermal neutron log must not begin until about 35 microseconds after the end of each neutron pulse. For example, if the neutron pulse duration is 100 microseconds, the univibrator 74 would be replaced with a pair of univibrators with delays of 135 and 865 microseconds, respectively. Then the thermal neutron log 82 is representative of the rate of detection of neutrons by the neutron detector 24 during the time interval beginning 135 microseconds and ending 1,000 microseconds after the initiation of each pulse of neutrons. It will be appreciated that the thermal neutron log measurement need not start as soon as the epithermal neutron population in the formations has substantially decayed away, i.e., about 35 microseconds after the end of each neutron pulse. This measurement can begin much later, say 100 microseconds after the end of the neutron pulse, without serious degradation of the thermal neutron log 82, unless the strength of the neutron source 20 is marginal. Similarly, the thermal neutron log measurement could start much sooner, say 10 microseconds after the end of each neutron pulse without serious degradation of the log 82, since the epithermal neutron population has already undergone substantial decrease by that time.

It is seen that epithermal neutron log 80 and thermal neutron log 82 are derived by separating the signal from a single neutron detector 24 into two time dependent portions. While both thermal neutron logs and epithermal neutron logs are old in this art it is believed that this is the first time that the above described method of obtaining this pair of logs from a single neutron detector is novel.

The epithermal neutron log and the thermal neutron log may be combined by dividing one by the other. The utility of this ratio will be apparent from the following discussion. The average epithermal neutron intensity, $I$, is a function of the range of neutrons in the adjacent formations. As such, it is primarily sensitive to the hydrogen content of the formation and thereby provides a measure of the fluid-filled porosity. The flux density of the thermal neutrons, $I_{th}$, (which are, as noted above, descended from the epithermal neutrons) is proportional to the integrated total number of epithermal neutrons, $I_o$, that is, from time zero to the time 50 microseconds (when essentially all epithermal neutrons have disappeared after a 15 microsecond duration pulse of fast neutrons). Thus, $I_o$ = No. of epithermals from each 15 microsecond pulse of fast neutrons. (1)

At 50 microseconds after each pulse of neutrons $I_{th} = aI_o,$ (2)

where a is constant. At any later time $I_{th} = aI_o e^{-k \sum t},$ (3)

where $k$ is a constant. So that the integrated number of thermal neutrons, $Th$, will be $$Th = \int_0^{950} I_{th} dt = aI_o \int_0^{950} e^{-k\Sigma t} dt \qquad (4)$$

or $Th = aI_o/k\Sigma$ (5)

(The integration is from 0 to 950 microseconds rather than from 50 to 1,000 microseconds, since as far as the thermal neutrons are concerned time zero is at 50 microseconds.) Thus, on rearranging (5) and making $k/a = K$:

Epithermals/thermals = $K\Sigma$ (6)

$K$ is a constant that depends on the sensitivity of neutron detector 24, the neutron source strength, and the detector-source spacing. $\Sigma$ is already measured by the apparatus of this invention and a log thereof is recorded as log 64. The $K\Sigma$ log can be recorded simultaneously with the conventional $\Sigma$ log 64 and the two intercompared. Differences between the two will occur primarily for three reasons: (1) The gamma ray detector (conventional $\Sigma$) and the neutron detector ($K\Sigma$) have different spacings from source 20. (2) $K\Sigma$ is not independent of well bore characteristics (the neutron signal from which it is derived includes neutrons returned to detector 24 by materials in the well bore, whereas this is not the case with the conventional $\Sigma$ log since for it only those gamma rays returning to detector 22 from the formation are recorded because of the long delay in measuring gamma rays), and (3) $K\Sigma$ will not be affected by oxygen activation (it is derived from neutron signals, whereas the conventional $\Sigma$ log 64 will be affected to some extent by the gamma rays emitted from oxygen activation in the formations).

Thus, intercomparison of the conventional $\Sigma$ log 64 and the $K\Sigma$ log will reveal when the conventional $\Sigma$ log is adversely affected by flowing water (due to the oxygen activation effects). Further, this intercomparison will indicate when well bore parameters are uncommonly influential on the conventional $\Sigma$ log, thereby possibly locating washouts or other major well bore anomalies.

Figure 3:
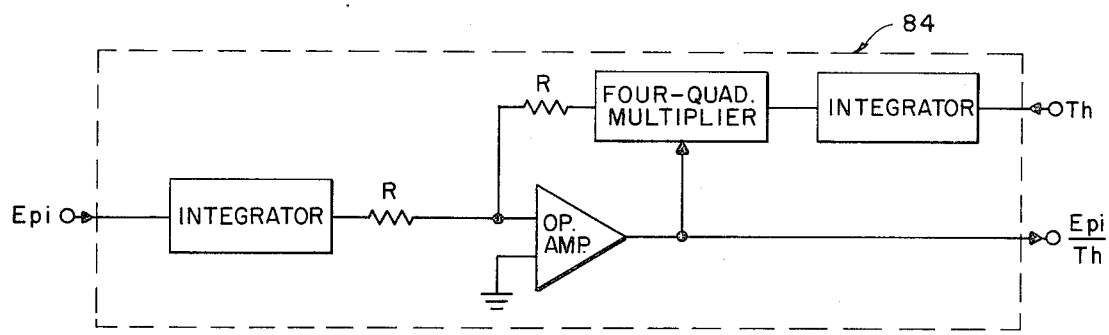
FIG. 3 is a block diagram of a suitable circuit for deriving an electrical signal proportional to the ratio of a pair of input electrical signals.

To derive the $K\Sigma$ log (hereafter sometimes called a log proportional to $\Sigma$), the outputs from signal gating circuit 70 are applied to a ratio circuit 84 which derives an electrical signal proportional to the ratio of the epithermal neutron portion of the signal from the neutron detector 24 to the thermal neutron portion of that signal and applies it to recorder 54 to obtain a record thereof in the form of $K\Sigma$ log 86. Many suitable circuits are available to those skilled in this art for use as ratio circuit 84; one suitable form of ratio circuit 84 is shown in block schematic form in FIG. 3. The ratio circuit of FIG. 3 makes use of an operational amplifier and a four-quadrant multiplier in a conventional manner to obtain the ratio of the two inputs (further description is not considered necessary since those skilled in the art will appreciate the operation of this circuit).

Yet another novel and useful ratio can be derived from the signals available from the apparatus of this invention, namely the ratio of the capture gamma ray log 68 to the thermal neutron log 82. This log is obtained by applying the gamma ray signal output of separation circuit 36 to ratio circuit 90 (may be similar to that of FIG. 3) and also applying the neutron signal output of gating circuit 70 to ratio circuit 90 after delaying it with a suitable delay circuit 88 whereby the neutron signal is delayed in accordance with the difference in spacing between the neutron detector 24 and the gamma ray detector 22. The electrical output signal from ratio circuit 90 is then applied to recorder 54 where it is recorded as log 92. This log will vary with varying gamma ray energy and capture gamma ray multiplicity. More specifically, log 92 will decrease when neutron capture is relatively due to the hydrogen and or boron content of the formation and will increase when the neutron capture is relatively due to chlorine. Thus, log 92 is an indicator of saltwater being present in the adjacent formation; for this reason, log 92 will sometimes hereafter be referred to as a salinity log. This salinity log is independent of the $\Sigma$ measurement and does not have the disadvantage suffered by the $\Sigma$ log 64, namely, that boron, hydrogen, and chlorine cannot be distinguished one from the other on the basis of the conventional $\Sigma$ log 64 alone.

Figure 4:
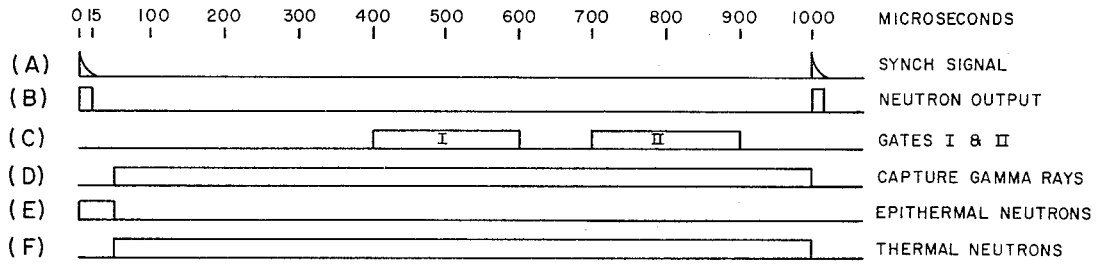
FIG. 4 is a time diagram useful in explaining the operating cycle and the various time periods therein during which particular logs are derived.

FIG. 4 is a time diagram that is useful in summarizing the operating cycle of neutron source 20 and the various time periods therein during which the signals from detectors 22 and 24 are used to derive the particular logs 58, 60, 64, 68, 80, 82, 86 and 92. The curves of FIG. 4 are based upon employing a neutron source which emits neutron pulses with a duration of 15 microseconds and a repetition rate of 1,000 a second.

From the description below and the above noted changes in operation, those skilled in this art can readily prepare a time diagram appropriate for use with a source which emits longer duration neutron pulses or which has a different repetition rate. Curve A of FIG. 4 is a representation of the synchronization signal from the synchronization generator circuit 34 and which is used to initiate pulses of neutrons from source 20 and to start the timing sequence in the surface apparatus. It is seen that the synchronization signal consists of pulses with very sharp leading edges 1,000 microseconds apart. The neutron output of source 20 is shown schematically in FIG. 4b as square wave pulses of 15 microseconds duration, 1,000 microseconds apart. It will be appreciated that these output pulses might be longer or shorter than 15 microseconds, depending on the characteristics of the neutron source and the associated electronics. Moreover the output pulse need not in fact be a square wave. The portion of the gamma ray signal from detector 22 utilized in obtaining the gates I and II logs 58 and 60, respectively, are shown in FIG. 4c. FIG. 4d indicates that the capture gamma ray log 68 is obtained by counting all of the gamma rays detected by detector 22, namely during the time period extending from 50 microseconds to 1,000 microseconds after the beginning of each pulse of neutrons. FIG. 4e indicates that the epithermal neutron log 80 is obtained by counting the neutrons detected in detector 24 during the time period beginning with the initiation of each pulse of neutrons and ending 50 microseconds later. FIG. 4f indicates that the thermal neutron log 82 is obtained by counting the neutrons detected by detector 24 during the time period beginning 50 microseconds after the end of each neutron pulse and ending 950 microseconds thereafter.

Another embodiment of our invention is one which is particularly applicable for use with neutron sources which emit pulses of long duration, i.e., longer than about 30 microseconds. For such sources the apparatus and methods described above in connection with FIG. 1 may be used to obtain the gate I log 58, the gate II log 60, the $\Sigma$ log 64, and the capture gamma ray log 68. The apparatus and methods of obtaining the epithermal log 80 and the thermal neutron log 82 will be somewhat different than described above in connection with FIG. 1. In this embodiment we prefer to separate the signal from neutron detector 24 into two time groups that are different from those described in connection with FIG. 1. In particular, univibrator 72 will have an adjustable delay in the range of 10 to 35 microseconds. Then the epithermal neutron log 80 will represent the time rate of detection of neutrons by detector 24 only during the first part of each neutron pulse from source 20, i.e., only during a time period prior to a significant number of thermal neutrons being produced (by energy degradation of the epithermal neutrons) in the formation and therefore prior to a significant number of thermal neutrons being captured in the formation. In this embodiment the thermal neutron log 82 will be produced by replacing univibrator 74 with a pair of univibrators in series, each with an adjustable delay. The delays will be chosen so that the thermal neutron log 82 will be a representation of that portion of the signal from neutron detector 24 which occurs during a time interval which begins about 35 microseconds after the termination of each neutron pulse and extends to the beginning of the next neutron pulse. The $K\Sigma$ log 86 and the salinity log 92 are obtained from the epithermal neutron, thermal neutron, and capture gamma ray signals generated in this embodiment of our invention in the same manner as the corresponding signals or used to obtain these logs in the FIG. 1 embodiment.

In another embodiment, a log similar to the salinity log 92 is produced by a different choice of signal gates such that a smaller dependence on well bore effects is attained. As previously explained in connection with the log 92, the objective is to produce a log indicative of variations in capture gamma ray characteristics relative to the thermal neutron intensity in the formation. Instead of choosing to integrate all the pulses from the respective detectors during the entire interval from 50 to 1,000 microseconds after each synchronization pulse, it may be preferred to choose only selected gate intervals of lesser duration for the two measurements. In particular, the gate interval from 400 to 600 microseconds may be chosen for both detectors. In the case of the gamma ray detector this is curve 58 in FIG. 1. In the case of the neutron detector the analagous curve can be obtained by employing the corresponding circuitry to select pulses in the appropriate gate interval. A preferred adjustment of the gate circuitry may not employ gates of exactly equal time and duration. In particular, it is desired to compare the measured gamma ray intensity with a measurement of the corresponding thermal neutron intensity. It will be recognized that gamma rays are transmitted from the formation to the detector at the speed of light whereas the thermal neutrons travel by diffusion and require a time as great as hundreds of microseconds depending on the diameter of the well bore and other factors. Accordingly, the gate setting for the thermal neutron measurement may be chosen later than the gate setting for the gamma ray measurement. Preferably, the respective gates will have the same duration, but the thermal neutron gate will be later by an amount between 50 and 300 microseconds. The exact setting of the neutron detector gate which gives optimum results may be determined experimentally under various well bore conditions and may be made selectable so that it may be set by the logging operator to suit the particular conditions encountered in a given logging operation.

In still another embodiment of the epithermal neutron log portion of our invention, we do not restrict the log 80 to representing only the detection of epithermal neutrons. In this embodiment, which is particularly applicable for use with neutron sources which emit long duration pulses of neutrons, we obtain an "apparent" epithermal neutron log by using that portion of the signal from neutron detector 24 which occurs during the first 100 microseconds, approximately, after the beginning of each neutron pulse as the signal which will be recorded as epithermal neutron log 80. It will be appreciated that, in this embodiment, the epithermal neutron log will be affected by the slowing down time of the emitted neutrons and by the thermal neutron lifetime and will also include some thermal neutrons. However, this will still be a useful log, since the primary use for the log 80 is to obtain an indication of the porosity of the formations and the thermal neutron effects are also dependent upon porosity.

Those skilled in the art will recognize that the beginnings and ends of the various gates used in the various embodiments of our invention are not extremely critical. It will generally be necessary to provide for some adjustment therein, since it is rare that the neutron sources produce pulses with a strictly square wave shape, i.e., it is rare that the beginning of each neutron pulse coincides precisely with the time of the front edge of the synchronization pulse. Similarly, it is rare for one of these pulsed neutron sources to cut off sharply at the end of each pulse.

Numerous other variations and modifications may obviously be made without departing from the scope and concept of the present invention. For example, the duration and repetition rates of the pulses from the source 20 may be varied within rather wide limits; however, the 15 microseconds duration and 1,000 pulses a second repetition rate referred to above are preferred. Further, the 50 microseconds after the initiation of each pulse of neutrons from the source 20 referred to in connection with the capture gamma ray log 68, the epithermal neutron log 80 and the thermal neutron log 82 is an optimum only when 15 microseconds duration neutron pulses are used. Some variation thereof is permissible; the important thing is that the gamma ray detector not be affected by the high neutron flux which is present during and immediately after the end of each pulse from the neutron source 20 and that as many of the epithermal neutrons be counted as is practicable. We have found that there are essentially no epithermals available to be counted later than approximately 35 microseconds after the end of the neutron pulse and that essentially no thermal neutrons are available to be counted prior to about 35 microseconds after the end of each neutron pulse, for pulse durations up to about 20 microseconds. Still further, those skilled in the art will recognize that not every one of the logs 58, 60, 64, 68, 80, 82, 86, and 92 will be necessary and desirable in solving every exploration situation that is faced in the field; accordingly, our invention contemplates recording only those which are necessary for particular situations.

The embodiments of the invention in which an exclusive property or privilege are claimed are defined as follows:

1. Pulsed neutron well logging apparatus for obtaining information about formations traversed by a well bore comprising:
   a pulsed source of neutrons;
   a neutron detector spaced from said source which generates a signal in response to neutrons reaching said detector;
   means for separating the signal from said neutron detector into a first signal and a second signal wherein
   said first signal is indicative of the detection of epithermal neutrons by said detector and represents that portion of the signal from said detector which occurs during a first time period extending from approximately the initiation of said neutron pulse to a time later than the end of said neutron pulse by an amount sufficient to permit all neutrons to be reduced substantially to thermal energy and said second signal is indicative of the detection of thermal neutrons by said neutron detector and represents that portion of the signal from said detector which occurs during a second time period extending from approximately the end of said first time period to approximately the initiation of the next neutron pulse from said source; and means for recording, in correlation with the depth of said neutron detector in a well bore, at least one of said first and second signals.

2. The apparatus in claim 1 further comprising:

means for generating a third signal representative of the ratio of said first signal to said second signal; and means for recording said third signal in correlation with the depth of said neutron detector in a well bore whereby a log proportional to the macroscopic thermal neutron cross-sections of said formations is obtained.

3. The apparatus in claim 2 further comprising:

means for generating a synchronization signal which identifies the initiation of each neutron pulse from said source; and wherein said means for separating the signal from said neutron detector into a first signal and a second signal is responsive to said synchronization signal.

4. Pulsed neutron well logging apparatus for obtaining information about formations traversed by a well bore comprising:

a pulsed source of neutrons;

a neutron detector spaced from said source which generates a signal in response to neutrons reaching said detector;

means for separating the signal from said detector into a first signal and a second signal wherein said first signal is indicative of the detection of epithermal neutrons by said detector and represents that portion of the signal from said detector which occurs during a first time period extending from approximately the initiation of said neutron pulse to a time in the range of 10 to 50 microseconds after the end of said neutron pulse and said second signal is indicative of the detection of thermal neutrons by said neutron detector and represents that portion of the signal from said detector which occurs during a second time period extending from a time in the range of 10 to 100 microseconds following the end of each neutron pulse to approximately the initiation of the next neutron pulse from said source; and means for recording, in correlation with the depth of said neutron detector in a well bore, at least one of said first and second signals.

5. Pulsed neutron well logging apparatus for obtaining information about formations traversed by a well bore comprising:

a pulsed source of neutrons;

a neutron detector spaced from said source which generates a signal in response to neutrons reaching said detector;

means for separating the signal from said detector into a first signal and a second signal wherein said first signal is indicative of the detection of epithermal neutrons by said detector and represents that portion of the signal from said detector which occurs during a first time period extending from approximately the initiation of said neutron pulse to approximately 35 microseconds after the end of said neutron pulse and said second signal is indicative of the detection of thermal neutrons by said neutron detector and represents that portion of the signal from said detector which occurs during a second time period extending from approximately 35 microseconds following the end of each neutron pulse to approximately the initiation of the next neutron pulse from said source; and means for recording, in correlation with the depth of said neutron detector in a well bore, at least one of said first and second signals.

6. Pulsed neutron well logging apparatus for exploring formations traversed by a well bore comprising:

a pulsed source of neutrons;

a gamma ray detector and a neutron detector spaced from said source which generates signals in response to gamma rays and neutrons respectively;

means for generating a first signal representative of the rate of detection of gamma rays by said gamma ray detector during a first time period which includes substantially all of the time between neutron pulses from said source whereby said first signal is a measure of the capture gamma rays produced in said formations by neutrons from said source;

means for generating a second signal representative of the rate of detection of neutrons by said neutron detector during a second time period extending from approximately 35 microseconds following the end of each neutron pulse from said source to approximately the beginning of the next neutron pulse from said source whereby said second signal is a measure of the thermal neutrons produced in said formation by neutrons from said source; and means for recording said first and said second signals in correlation with the depth of said detectors in a well bore.

7. The apparatus in claim 6 which further comprises:

means for generating a third signal indicative of the ratio of said first signal to said signal whereby a measure of the salinity of said formations is obtained; and means for recording said third signal in correlation with the depth of said detectors in a well bore.

8. The apparatus in claim 7 which further comprises:

means for generating a synchronization signal which identifies the beginning of each neutron pulse from said source; and wherein said means for generating a first signal and said means for generating a second signal are responsive to said synchronization signal.

9. The apparatus in claim 6 wherein said gamma ray detector is a scintillation counter.

10. The apparatus in claim 9 wherein said scintillation counter includes a cesium iodide phosphor.

11. The apparatus in claim 9 wherein said scintillation counter includes a calcium tungstate phosphor.

12. Pulsed neutron well logging apparatus for obtaining information about formations traversed by a well bore comprising:
- a pulsed source of neutrons;
- a gamma ray detector and a neutron detector spaced from said source which generates signals in response to gamma rays and neutrons, respectively;
- means for generating a first signal representative of the rate of detection of gamma rays by said gamma ray detector during a first time period following initiation of neutron emission from said source;
- means for generating a second signal representative of the rate of detection of gamma rays by said gamma ray detector during a second time period later than said first time period, said second time period having a duration substantially equal in duration to said first time period;
- means for generating a third signal representative of the logarithm of the ratio of said first signal to said second signal;
- means for generating a fourth signal representative of the rate of detection gamma rays by said gamma ray detector during a third time period which includes substantially all of the time between neutron pulses from said source and which overlaps both said first and said second time periods;
- means for generating a fifth signal representative of the rate of detection of neutrons by said neutron detector during a time period extending from approximately the initiation of each of said neutron pulses to approximately 35 microseconds after the end of each of said neutron pulses;
- means for generating a sixth signal representative of the rate of detection of neutrons by said neutron detector during a time period extending from approximately 35 microseconds following the end of each neutron pulse to approximately the beginning of the next neutron pulse from said source;
- means for generating a seventh signal representative of the ratio of said fifth signal to said sixth signal;
- means for generating an eighth signal representative of the ratio of said fourth signal to said sixth signal;
- means for recording, in correlation with the depth of said detectors in a well bore, at least one of said first, second and third signals and at least one of said fourth, fifth, sixth, seventh and eighth signals.

13. The apparatus in claim 12 further comprising:
- means for generating a synchronization signal which identifies the beginning of each neutron pulse from said source; and
- wherein said means for generating said first, second, fourth, fifth, and sixth signals are responsive to said synchronization signal.

14. The apparatus in claim 12 wherein said means for recording includes means for recording at least said third, fifth, and seventh signals simultaneously in correlation with the depth of said detectors in a well bore.

15. Pulsed neutron well logging apparatus for obtaining information about formations traversed by a well bore comprising:
- a pulsed source of neutrons;
- a gamma ray detector and a neutron detector spaced from said source which generates signals in response to gamma rays and neutrons respectively;
- means for generating a first signal representative of the rate of detection of gamma rays by said gamma ray detector during a first time period following initiation of neutron emission from said source;
- means for generating a second signal representative of the rate of detection of gamma rays by said gamma ray detector during a second time period later than said first time period, said second time period having a duration substantially equal in duration to said first time period;
- means for generating a third signal representative of the logarithm of the ratio of said first signal to said second signal;
- means for generating a fourth signal representative of the rate of detection of neutrons by said neutron detector during a time period extending from approximately the initiation of each of said neutron pulses to approximately 35 microseconds after the end of each of said neutron pulses;
- means for generating a fifth signal representative of the rate of detection of neutrons by said neutron detector during a time period extending from approximately 35 microseconds following the end of each neutron pulse to approximately the beginning of the next neutron pulse from said source;
- means for generating a sixth signal representative of the ratio of said fourth signal to said fifth signal;
- means for recording, in correlation with the depth of said detectors in a well bore, at least said third, fourth, and sixth signals simultaneously.

16. Apparatus for pulsed neutron well logging comprising:
- subsurface apparatus including
  - a source of repetitive pulses of high-energy neutrons, said pulses being of approximately 15 microseconds duration;
  - a neutron detector spaced from said source and which generates pulses in response to either thermal or epithermal neutrons intercepted by said detector as a result of interactions in adjacent formations involving the high-energy neutrons from said sources; and
  - means for transmitting said pulses from said detector to the surface of the earth; and
- surface apparatus including
  - means for generating a first signal indicative of said epithermal neutrons and representative of the rate of detection of neutrons by said detector in a first time period beginning approximately at the beginning of each neutron pulse from said source and ending approximately 50 microseconds later;
  - means for generating a second signal indicative of said thermal neutrons and representative of the rate of detection of neutrons by said detector in a second time period beginning approximately at the end of said first time period and ending approximately at the beginning of the next pulse of neutrons from said source; and
  - means for simultaneously recording said first signal and said second signal in correlation with the depth of said detector whereby an epithermal neutron log and a thermal neutron log, respectively, are obtained simultaneously with a single detector.

17. The apparatus in claim 16 further comprising:

means for generating a third signal representative of the ratio of said first signal to said second signal; and means for recording said third signal in correlation with the depth of said detector whereby a log proportional to the macroscopic thermal neutron cross-section of the formations traversed by said subsurface apparatus is obtained.

18. The apparatus in claim 17 further comprising:

means for generating a synchronization signal which identifies the initiation of each neutron pulse from said source; and wherein said means for separating the signal from said detector into a first signal and a second signal is responsive to said synchronization signal.

19. A method of pulsed neutron well logging for exploring formations traversed by a well bore comprising:

irradiating said formations with repetitive pulses of neutrons;

measuring, simultaneously and in correlation with the depth at which said irradiating occurs, first indications of the thermal neutron population within said formations resulting from said irradiating during two substantially equal time intervals during the quiescent intervals between neutron pulses, an indication of the number of capture gamma rays produced in said formations by said irradiating, an indication of the number of epithermal neutrons produced in said formations by said irradiating, and second indications of the number of thermal neutrons produced in said formations by said irradiating step; and recording said indications of the thermal neutron populations, capture gamma rays, epithermal neutrons, and thermal neutrons in correlation with the depth of said measuring, wherein said neutron pulses have a duration of approximately 15 microseconds and a repetition rate of approximately 1,000 per second;

said time intervals have a duration of approximately 200 microseconds beginning, respectively, approximately 400 microseconds and approximately 700 microseconds after the beginning of each neutron pulse;

said measuring an indication of the number of capture gamma rays is a measurement of rate of the gamma ray detection during a time period beginning approximately 50 microseconds after the beginning of each neutron pulse and ending just prior to the beginning of the next neutron pulse during said irradiating;

said measuring an indication of the number of epithermal neutrons is a measurement of the rate of neutron detection during a time period beginning with the initiation of each neutron pulse and ending approximately 50 microseconds later during said irradiating; and said measuring of said second indications of the number of thermal neutrons is a measurement of the rate of neutron detection during a time period beginning approximately 50 microseconds after the beginning of each neutron pulse and ending approximately 950 microseconds later during said irradiating.

20. A method of pulsed neutron well logging for exploring formations traversed by a well bore comprising:

irradiating said formations with repetitive pulses of neutrons;

measuring the decay rate of the thermal neutron population within said formations resulting from said irradiating step as an indication of the macroscopic thermal neutrons cross-sections of said formations;

measuring an indication of the number of epithermal neutrons produced in said formations by said irradiating step; and measuring an indication of the number of thermal neutrons produced in said formations by said irradiating step;

determining the ratio of said indications of the number of epithermal neutrons to said indication of the number of thermal neutrons; and recording said indication of the macroscopic thermal neutron cross-sections of said formations and said ratio simultaneously in correlation with the depth of said measuring.

21. The method of claim 20 further comprising:

recording said indication of the number of epithermal neutrons produced in said formation by said irradiating step.

22. A method of pulsed neutron well logging for exploring formations traversed by a well bore comprising:

irradiating said formations with repetitive pulses of neutrons;

detecting, with a single detector which produces output pulses, both epithermal neutrons and thermal neutrons returning to said well bore as a result of said irradiating step;

separating the output pulses produced by said detector into first and second groups wherein said first group includes all those output pulses occurring from the beginning of each neutron pulse and extending for approximately 35 microseconds after the end of each neutron pulse; and said second group includes all those pulses which are not included in said first group;

deriving first and second electrical signals indicative of the time rate of occurrence of said output pulses in said first and second groups, respectively; and recording said first and second electrical signals simultaneously in correlation with the depth at which said irradiating step occurs.

23. The method described in claim 22 including the steps of:

deriving a third electrical signal indicative of the ratio of said first signal to said second signal; and recording said third electrical signal in correlation with the depth at which said irradiating step occurs.

24. A method of pulsed neutron well logging for exploring formations traversed by a well bore comprising:

irradiating said formations with repetitive pulses of neutrons;

deriving a first electrical signal representative of the macroscopic thermal neutron cross-sections of said formations;

deriving a second electrical signal indicative of the number per unit of time of epithermal neutrons returning to said well bore as a result of said irradiating step;

deriving a third electrical signal indicative of the number per unit of time of thermal neutrons returning to said well bore as a result of said irradiating step;

deriving a fourth electrical signal indicative of the ratio of said second signal to said third signal; and recording said first signal and said fourth signal simultaneously in correlation with the depth at which said irradiating step occurs.

25. The method of claim 24 further comprising:

recording, simultaneously with recording said first and fourth signals, at least one of said second and third signals in correlation with the depth at which said irradiating step occurs.

26. A method of pulsed neutron well logging for exploring formations traversed by a well bore comprising:

irradiating said formations with repetitive pulses of neutrons;

measuring, in correlation with the depth at which said irradiating occurs and during the quiescent intervals between neutron pulses, indications of the thermal neutron population within said formations resulting from said irradiating during two substantially equal time intervals;

generating a first signal representative of the logarithm of the two indications of the thermal neutron population in said formations;

measuring, with a single neutron detector and in correlation with the depth at which said irradiating occurs, indications of the rate of detection of epithermal neutrons and thermal neutrons produced in said formations by said irradiating step;

generating a second signal representative of the ratio of said indications of the rate of detection of epithermal neutrons to the rate of detection of thermal neutrons; and recording said first and second signals simultaneously and in correlation with the depth at which said irradiating step occurs.

27. The method of claim 26 further comprising:

recording said indication of the rate of detection of epithermal neutrons produced in said formations by said irradiating step.

* * * * *